(12) United States Patent
Mishra et al.

(10) Patent No.: US 8,559,437 B2
(45) Date of Patent: Oct. 15, 2013

(54) PACKET CONCATENATION IN WIRELESS NETWORKS

(75) Inventors: Partho P. Mishra, Cupertino, CA (US); Sandesh Goel, Mountain View, CA (US); Vincent K. Jones, Rewood City, CA (US); Alireza Raissinia, Monte Sereno, CA (US)

(73) Assignee: QUALCOMM Incorporated, San Diego, CA (US)

( * ) Notice: Subject to any disclaimer, the term of this patent is extended or adjusted under 35 U.S.C. 154(b) by 375 days.

(21) Appl. No.: 12/778,754

(22) Filed: May 12, 2010

(65) Prior Publication Data

US 2010/0220661 A1 Sep. 2, 2010

Related U.S. Application Data

(63) Continuation of application No. 11/107,386, filed on Apr. 15, 2005, now Pat. No. 7,733,866.

(60) Provisional application No. 60/562,915, filed on Apr. 15, 2004.

(51) Int. Cl.
*H04L 12/28* (2006.01)
*H04L 12/56* (2011.01)

(52) U.S. Cl.
USPC ............................ 370/393; 370/349; 370/432

(58) Field of Classification Search
USPC ................... 370/393, 432, 442, 445, 449, 349
See application file for complete search history.

(56) References Cited

U.S. PATENT DOCUMENTS

| 4,636,791 | A | 1/1987 | Burke et al. |
|---|---|---|---|
| 7,170,893 | B2 | 1/2007 | Rajan et al. |
| 7,733,866 | B2 | 6/2010 | Mishra et al. |
| 2002/0018467 | A1 | 2/2002 | Rajan |
| 2002/0071448 | A1* | 6/2002 | Cervello et al. ............... 370/445 |
| 2002/0118696 | A1* | 8/2002 | Suda ............................. 370/432 |
| 2003/0169769 | A1 | 9/2003 | Ho et al. |
| 2003/0235197 | A1 | 12/2003 | Wentink |
| 2004/0073939 | A1 | 4/2004 | Ayyagari |
| 2005/0008027 | A1 | 1/2005 | Limb et al. |

(Continued)

FOREIGN PATENT DOCUMENTS

| JP | 1997064899 | 3/1997 |
|---|---|---|
| JP | 2003069642 A | 3/2003 |
| WO | WO0042737 | 7/2000 |

OTHER PUBLICATIONS

International Search Report and Written Opinion—PCT/US2005/012962, International Search Authority—European Patent Office—Oct. 24, 2007.

(Continued)

*Primary Examiner* — Christian Hannon
(74) *Attorney, Agent, or Firm* — Howard Seo

(57) ABSTRACT

A wireless network includes a transmitting device and a plurality of receiving devices. The transmitting device is configured to receive a plurality of data packets, including a first data packet and a second data packet, prepare a preamble, prepare a signal field for each of the plurality of data packets, including a first signal field based on the first data packet and a second signal field based on the second data packet, and broadcast the preamble, the first signal field, the first data packet, the second signal field, and the second data packet as a concatenated packet.

37 Claims, 6 Drawing Sheets

(56) References Cited

U.S. PATENT DOCUMENTS

2005/0180369 A1    8/2005    Hansen et al.
2005/0180381 A1    8/2005    Retzer et al.
2005/0232179 A1   10/2005   Dacosta et al.

OTHER PUBLICATIONS

Sunghyun Choi Ed—Institute of Electrical and Electronics Engineers: "IEEE 802.11e MAC-Level FEC performance evaluation and enhancement", GLOBECOM'02. 2002—IEEE Global Telecommunications Conference. Conference Proceedings. Taipei, Taiwan, Nov. 17-21, 2002; [IEEE Global Telecommunications Conference], New York, NY: IEEE, US, vol. 1, Nov. 17, 2002, pp. 773-777, XP010636055, DOI: DOI: 10.1109/GLOCOM.2002.1188183 ISBN: 978-0-7803-7632-8.
Supplementary Partial European Search Report—EP05736235—Search Authority—The Hague—Jan. 14, 2011.

* cited by examiner

PACKET CONCATENATION IN WIRELESS NETWORKS

CROSS-REFERENCES TO RELATED APPLICATIONS

This application is a continuation of U.S. patent application Ser. No. 11/107,386, entitled "PACKET CONCATENATION IN WIRELESS NETWORKS," filed Apr. 15, 2005, which claims the benefit of, U.S. Provisional Patent Application No. 60/562,915, entitled "PACKET CONCATENATION," filed on Apr. 15, 2004. The entireties of these applications are incorporated herein by reference.

BACKGROUND OF THE INVENTION

Embodiments of the present invention relate generally to packet-based wireless networks. More specifically, embodiments of the invention related to systems and methods for transmitting packets in a packet-based wireless network by concatenating a plurality of data packets into a single packet transmission.

As wireless networks become increasingly popular, there is an ever greater need to provide higher data throughput from existing bandwidth allocations. Typically, a wireless network must operate within an assigned band of frequencies. This is usually the case regardless of the type of physical transmission technique utilized. For example, frequency hopping systems usually must only hop to frequencies contained within a fixed range of frequencies. Similarly, spread spectrum systems must remain within the bounds of a well-defined frequency band. Of course, frequency division multiplexing systems also are confined to fixed bandwidths. Thus, a fundamental performance goal in the implementation of wireless networks is to provide as much data throughput as possible given a particular bandwidth allocation.

Packet-based wireless systems typically transmit and receive one packet at a time over the wireless medium. Such transmissions typically require header information to be appended to a packet of data, such as an Ethernet packet, so that medium access control (MAC) and physical layer (PHY) functions can be performed for a wireless transmission. This added header information is overhead added for wireless transmission and reception.

Consider, for example, the illustrative wireless network 100 of FIG. 1. The wireless network 100 includes an access point (AP) 102 and stations (STAs) 104 and 106. Typically, 30 wireless networks may include numerous APs and STAs, but the simplified wireless network 100 is shown in here for illustrative purposes. Each of the three nodes, AP 102, STA 104, and STA 106, is able to both transmit and receive packets over the wireless medium. Different types of communication may be possible. For example, in one arrangement, all communication may be required to go through AP 102. Thus, if STA 104 wishes to transmit a packet to STA 106, the transmission must first be sent to AP 102, then relayed to STA 106. In another arrangement, STA 104 may communicate directly with STA 106, without involving AP 102. Regardless of the type of communication chosen, a fundamental component is a transmission that involves one node (AP or STA) acting as the transmitter and another node (AP or STA) acting as the receiver of the transmission.

In this example, the wireless network 100 will be assumed to operate according to 802.11 protocols. According to such protocols, Ethernet packets are accepted by the MAC-layer processing of an 802.11 transmitting device, AP 102. The MAC layer processing appends MAC control information to the beginning and the end of the data packet and various control fields to the frame body. The entire MAC frame is then sent to the PHY for processing.

There are various PHY packet formats according to 802.11 protocols. An exemplary format is the PHY packet format for 802.11a. Pictured in FIG. 2. The MAC frame is accepted from the MAC-layer and various control and management information is appended to form a Physical Layer Convergence Protocol (PLCP) Data Unit (PPDU) 200. The PPDU 200 includes a PLCP Preamble (PLCP Preamble), a Signal Field (SiF), a Service Field (SrF), a PLCP Service Data Unit (PSDU), six tail bits (Tail), and pad bits (Pad). The PLCP Preamble is used for receiver synchronization (gain, time and frequency). The Signal Field is used by the receiver to determine the data rate and length of the packet being sent. The Service Field is used by the receiver for descrambling operation. The tail and pad bits complete the Forward Error Correction (FEC) decoding and fill out the available Orthogonal Frequency Division Multiplexing (OFDM) symbols.

The control and PHY management control fields added to the PSDU are overhead that reduces the throughput of the packet data contained in the PSDU. The PLCP preamble occupies 16 µs of time. The Signal Field occupies 4 µs of time. Together this 20 µs of time is the primary overhead in the PPDU.

When the PSDU data size is very large, the extra 16 µs of PLCP preamble may not be much overhead. For example, consider the case of a 1500 byte PSDU with 54 Mbps used as the PHY rate. A PLCP preamble of 16 µs is very little overhead (about 6.6%) to the total time it takes to transmit 1500 bytes. However, a 64 byte PSDU occupies very little time on the air. Hence, the PLCP header adds 50% overhead. The below table summaries the effect of the 16 µs of PLCP preamble overhead on the effective data rate. The effective data rate is computed by dividing the total number of PSDU bits transmitted by the amount of time it takes to transmit.

| PSDU Size (bytes) | 1500 | 64 |
|---|---|---|
| PHY Date Rate (Mbps) | 54 | 54 |
| Payload Time (µs) | 224 | 12 |
| Packet Time (µs) | 244 | 32 |
| PLCP Overhead (%) | 6.6 | 50.0 |
| Effective Data Rate (Mbps) | 49.18 | 16.00 |

Because the efficiency of a transmission in a packet-based wireless network can be increased by decreasing the amount of overhead necessary to transmit a data packet, improved methods and systems are needed that decrease such overhead.

BRIEF SUMMARY OF THE INVENTION

Embodiments of the invention thus provide a wireless network. The network includes a transmitting device and a plurality of receiving devices. The transmitting device is configured to receive a plurality of data packets, including a first data packet and a second data packet, prepare a preamble, prepare a signal field for each of the plurality of data packets, including a first signal field based on the first data packet and a second signal field based on the second data packet, and broadcast the preamble, the first signal field, the first data packet, the second signal field, and the second data packet as a concatenated packet.

In some embodiments, the transmitting device is further configured to prepare a standard signal field and broadcast the standard signal field as part of the concatenated packet. The transmitting device may be configured to broadcast the preamble, the standard signal field, the first signal field, the first data packet, the second signal field, and the second data packet in order and the first signal field may be immediately followed in time by the first data packet and the second signal field may be immediately followed in time by the second data packet. The transmitting device may be configured to receive a third data packet of the plurality of data packets while broadcasting the preamble, the first signal field, the first data packet, the second signal field, and the second data packet as a concatenated packet and broadcast the third data packet and its corresponding signal field as part of the concatenated packet. The transmitting device may be configured to transmit the first data packet and the second data packet to different of the plurality of receiving devices. The transmitting device may be configured to transmit the first data packet and the second data packet to different of the plurality of receiving devices at different transmission rates.

In some embodiments, the network may be an 802.11-based network. At least a first one of the receiving devices may operate according to a first acknowledge policy. At least a second one of the plurality of receiving devices may operate according to a second acknowledgement policy. The first and the second acknowledgement policies may be different. The first and second acknowledgement policies may be Immediate Acknowledge, Block Acknowledge, or No Acknowledge. At least a first one of the plurality of receiving devices may be configured to correctly receive concatenated packets and at least a second one of the plurality of receiving devices may not be configured to receive concatenated packets. The transmitting device may be further configured to transmit the remaining data packets in the plurality of data packets and the corresponding signal fields as part of the concatenated packet. The plurality of data packets may include at least 1000 data packets.

Some embodiments provide a concatenated packet configured for transmission in a packet-based wireless network. The packet includes a preamble, a plurality of data packets, and a plurality of signal fields. Each of the plurality of data packets is preceded in time by one of the plurality of signal fields. A first one of the plurality of data packets is directed to a first receiving device. A second one of the plurality of data packets is directed to a second receiving device.

In some embodiments of the concatenated packet, the plurality of data packets includes at least 1000 data packets. Each of the plurality of data packets may be immediately preceded in time by one of the plurality of signal fields. The first one of the plurality of data packets may be directed to the first receiving device at a first data rate and the second one of the plurality of data packets may be directed to the second receiving device at a second data rate. Each signal field may include at least a rate field that identifies the data rate of the data packet that the signal field precedes in the concatenated packet and a length field that identifies the length of the data packet that the signal field precedes.

The concatenated packet may be configured for transmission in an 802.11-based network. The concatenated packet may include a standard signal field. The standard signal field may include a reserved bit and a state of the reserved bit may signal a concatenated packet. Each of the plurality of signal fields may include an error check field relating to its contents. Each signal field may include a continuation field having at least two states and a change in the state of the continuation field from one signal field to a subsequent signal field may indicate that the data packet following the subsequent signal field is the last data packet of the concatenated packet.

In still other embodiments, a method of communicating in a packet-based wireless network includes, at a transmitting device, receiving a plurality of data packets, concatenating the plurality of packets into a concatenated packet, appending a preamble to the concatenated packet, and broadcasting the concatenated packet to the network. Each of the plurality of data packets in the concatenated packet is preceded by a signal field, the contents of which relate to the subsequent data packet.

In some embodiments of the method, the plurality of data packets may include at least 1000 data packets. Each signal field may include at least a rate field that identifies the data rate of the data packet that the signal field precedes in the concatenated packet and a length field that identifies the length of the data packet that the signal field precedes. Each signal field may include a continuation field having at least two states and a change in the state of the continuation field from one extended signal field to an immediately subsequent signal field may indicate that the data packet following the subsequent signal field is the last data packet of the concatenated packet. Each signal field may include a reserve field having a plurality of states and a state of the reserve field may implement a function such as space-time coding, beam-forming, adaptive bandwidth reception, compression initialization, and/or the like.

In some embodiments of the method, the network may be an 802.11-based network. The method may include including a standard signal field in the concatenated packet. The method may include, at a receiving device, using the signal field to determine an amount of time to yield the network. The method may include using one of the plurality of signal fields to override the amount of time to yield the network. The method may include employing a MAC-protection mechanism with respect to at least one network element. Broadcasting the concatenated packet to the network may include broadcasting the concatenated packet to a plurality of receivers. At least a first one of the plurality of data packets may be directed to a first one of the plurality of receivers and at least a second one of the plurality of data packets may be directed to a second one of the plurality of receivers. The first one of the plurality of data packets may be directed to the first one of the plurality of receivers at a first data rate and the second one of the plurality of data packets may be directed to the second one of the plurality of receivers at a second data rate. The first data rate and the second data rate may bee different.

The method also may include, from the transmitting device, requesting an acknowledgement from the first one of the plurality of receivers, and in the absence of an acknowledgement from the first one of the plurality of receivers, rebroadcasting the concatenated packet. The method also may include, from the transmitting device, requesting an acknowledgement from the first one of the plurality of receivers and in the absence of an acknowledgement from the first one of the plurality of receivers, rebroadcasting the acknowledgement request. The method also may include, from the transmitting device, requesting an acknowledgement from the first one of the plurality of receivers and in the absence of an acknowledgement from the first one of the plurality of receivers, rebroadcasting only the data packets of the plurality of data packets directed to the first one of the plurality of receivers. Receiving a plurality of data packets may include receiving at least first and second data packets, in which case the method may include receiving at least a third data packet and concatenating the third data packet into the concatenated packet while broadcasting the concatenated packet to the network. At least one of the plurality of signal fields may include an error check field, in which case the method may include, at a receiving device, using the error check field of a particular signal field to evaluate for correctness the particular signal field. At least one of the plurality of signal fields may include an error check field, in which case the method may include, at a receiving device, using the error check field of a particular signal field to determine whether the concatenated packet is in fact a concatenated packet. The method also may include evaluating at least one network transmission characteristic and using the at least one network transmission characteristic to alter a maximum duration of a subsequent concatenated packet. The network transmission characteristic may be time-variation.

Still other embodiments provide a concatenated packet configured for transmission in an 802.11 network. The packet includes a plurality of data fields and a plurality of extended signal fields. Each extended signal field relates to a corresponding one of the data fields and includes information relating to its corresponding data field. The packet also includes a standard signal field having information relating to the concatenated packet and a preamble. The preamble and the standard signal field precede in time the plurality of data fields and the plurality of extended signal fields. The plurality of data packets may include at least 1000 data packets. One of the plurality of data fields may include a MAC management frame.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

According to embodiments of the invention, transmission efficiency is increased by concatenating data packets together and applying header information to the concatenated packet so as to amortize the overhead among multiple data packets. Packet concatenation differs from know packet aggregation techniques for a number of reasons, all of which do not necessarily apply to all embodiments. The reasons include, for example:

packet concatenation allows different types of packets (data, voice, video, management) to be concatenated together on the fly at the PHY-MAC interface;

packet concatenation is designed for wireless, where a PHY preamble is amortized over many packets to be sent over the air;

packet concatenation allows packets destined for multiple receivers (at different ranges) to be combined;

packet concatenation allows packets to be sent at different data rates;

packet concatenation does not add significant latency to the overall transmission; and packet concatenation works at the MAC-PHY interface.

Further, while embodiments of the invention will be described hereinafter in terms of 802.11 transmission protocols, this is not a requirement. Embodiments of the invention may be applied to transmissions in any of a variety of packet-based wireless networks.

Figure 1:
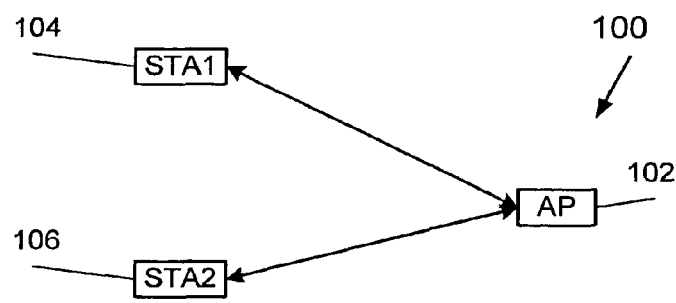
FIG. 1 depicts an illustrative wireless network.
Figure 2:
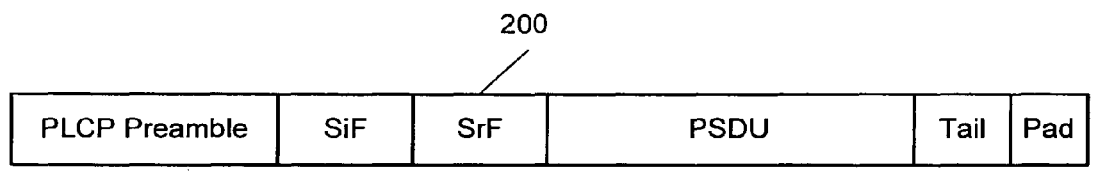
FIG. 2 illustrates an 802.11a PHY packet format.
Figure 3:
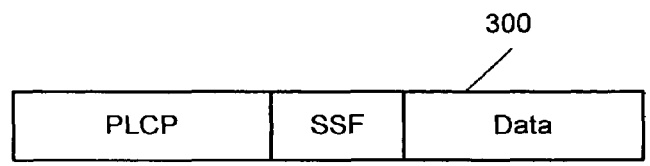
FIG. 3 illustrates a simplified 802.11 PHY packet format.

Attention is directed to FIG. 3, which illustrates a simplified version 300 of the 802.11x data frame 200 of FIG. 2 ("802.11x" will be understood to refer herein to any applicable 802.11 format such as, but not limited to, 802.11a, 802.11g or 802.11n). The frame 300 includes OFDM Data (Data, which includes the Service Field, PSDU, tail bits, and pad bits), a Standard Signal Field (SSF), and a PLCP Preamble (PLCP).

Figure 4:
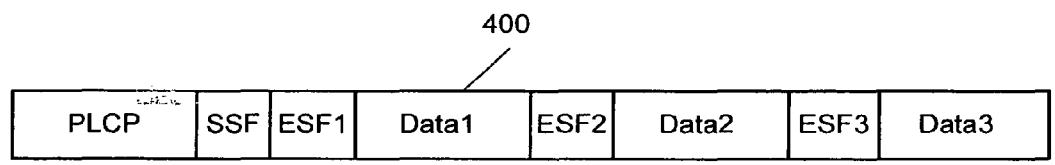
FIG. 4 illustrates a concatenated data frame according to embodiments of the invention.

FIG. 4 illustrates a concatenated data frame 400 according to embodiments of the invention. The concatenated frame is based on the 802.11x format of FIG. 3 in that it includes a PLCP preamble and a SSF. The frame 400, however, includes multiple OFDM Data fields (Data1, Data2, Data3), each preceded by an Extended Signal Field (ESF1, ESF2. ESF3). Like the SSF, each ESF is 4 μs long. As will be described in more detail hereinafter, each ESF carries information that allows a transmitter to communicate to the receiver the composition of a concatenated packet (chunk).

As is apparent, the PLCP Preamble and SSF overhead is thereby amortized over the entire chunk. Data packets can be transmitted using a single PLCP Preamble. Each data frame, which includes PSDU, Service Field, tail, and pad bits, is delimited by the immediately preceding ESF.

According to embodiments of the invention relating to 802.11 transmissions, the content of an SSF in a concatenated packet is similar to the content of an SSF used in a standard 802.11x frame. Exceptions include a "reserved bit," which may be set to 1 to indicate that the frame is a chunk instead of a standard 802.11x frame. In some embodiments, however, the reserved bit need not be set to 1 if a modification to the PLCP Preamble indicates a non-standard-802.11x packet or if receivers are designed to detect an ESF directly following an SSF.

For example, concatenation might be used exclusively for higher PHY data rate modes that employ Multiple-Input-Multiple-Output (MEMO) spatial division multiplexing or larger signal bandwidths of 40 MHz or 80 MHz. In such cases, the PLCP preamble may be designed specifically for either MEMO transmission and reception or channel bonding. Hence, the 802.11a/g SSF may still be used, but the reserve bit need not be altered. As another example, receivers capable of receiving concatenated packets may have circuitry that checks for the existence of an ESF after the SSF for every packet received, whether that packet was concatenated or not. In this case, the CRC check computed within the ESF is a reliable mechanism to allow such ESF detection.

Continuing with the example of an 802.11 transmission according to embodiments of the invention, the length field in the SSF of a concatenated packet represents the length of the entire concatenated packet, not just the length of the first data packet within the concatenated packet. The length field works in combination with the data rate field to inform receivers of the length of time of the transmission. As a result, legacy 802.11 receivers that are not aware of concatenation treat the chunk as a single 802.11x packet and appropriately defer the wireless medium for the correct amount of time.

In some specific embodiments, the rate field of the SSF is set to 6 Mbps. This rate results in the longest transmission time for all lengths. The length field is set to include the time required to send all the constituent packets in the chunk (along with their respective ESF's). As will be described in greater detail below, the length field need not be set to a precise length since the intent is to cause legacy devices that are not aware of concatenation to yield the transmission medium to a concatenated transmission. Ideally, the transmission duration as determined by the rate and length fields at least bounds the actual transmission. Concatenated-packet enabled receivers use the length field in the SSF for deferral. As will be described in greater detail below, if an ESF is present, concatenation-enabled devices use the length field in the ESF for the purpose of data detection. The last ESF contains the exact time left for the concatenated packet and may thus override the length in the SSF. Concatenated-packet enabled receivers also may use the length field in the SSF to compute defer-mechanisms such as the Clear Channel Assessment (CCA). Other embodiments are possible.

As mentioned previously, in some embodiments each data packet in a concatenated packet transmission is immediately preceded by an ESF. Each ESF carries management information about its associated data packet that is needed by the receiver. For example, continuing with 802.11 transmission protocols, each ESF carries information about what PHY data rate is used to transmit its associated data packet. Hence, different data packets within a concatenated packet may be transmitted at different PHY rates. This enables efficient transmission of a concatenated packet having data packets directed to different receivers that may be at different ranges from the transmitter. As is known, it is preferable to send data at the highest PHY rate possible to improve network throughput as long as the PHY rate is not too high such that the receiver cannot reliably detect the data from noise and interference. With receivers at various distances from a transmitter, each receiver receives the chunk at different signal-to-noise ratios. Hence, each transmitter-receiver link may support different PHY rates for reliable communication. It is advantageous, therefore, to send a single chuck with a single PLCP preamble, but having different PHY data rates for different receivers to which data packets are directed.

Each ESF also may include information identifying the length of its associated data packet. Because a receiver typically needs to know when to terminate reception of a data packet, the ESF may include the length in time of the packet so that the receiver knows when to stop receiving data.

Each ESF also may carry an error checking mechanism so that a receiver may reliably confirm the contents of the ESF. An example given in FIG. 6 is a 16-bit Cyclic Redundancy Check (CRC) computed over the contents of the ESF.

Each ESF may also carry information that identifies the number of packets that remain in the chunk. One method for signaling this information to is add one bit in the ESF that is set to 1 only when the following data packet is the last packet in the chunk. This concept is illustrated in the embodiment 500 of FIG. 5.

Alternatively, the single bit may be set in reverse polarity. In such cases, the bit is a "continuation bit." If the bit is set to 1, it means that there is another ESF following the end of current packet; otherwise a 0 indicates that the following packet is the last packet in the current chunk.

Figure 6:
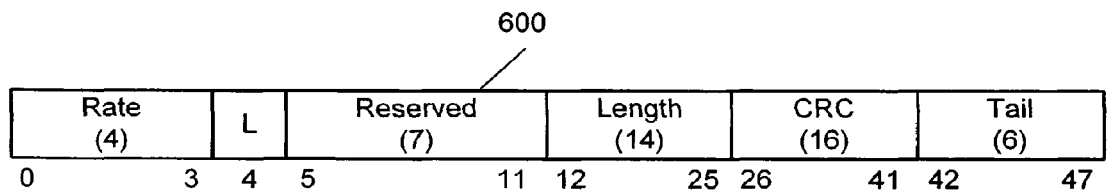
FIG. 6 illustrates an exemplary Extended Service Field for a concatenated packet according to embodiments of the invention.

An exemplary format for an ESF 600 is shown in FIG. 6 where the ESF 600 is encoded with a PHY rate of 12 Mbps, or Quadrature Phase Shift Keying (QPSK) modulation with ½ rate Forward Error Correction (FEC). The PHY rate of the constituent data packet is given by four bits. A single bit, labeled "L", represents the "last" packet designation. The length of the constituent data packet is given by 14 bits of "Length". There is a 16 bit CRC check (CRC) on the contents of the ESF 600. This allows the receiver to check with very high probability the accuracy of the ESF 600 contents. The six tail bits (Tail) allow the receiver to finish the FEC decoding in a robust fashion.

The reserved bits (Reserved) in the ESF 600 may be used in a variety of ways, including, for example, transmitter optimization signaling such as space-time coding, beam-forming, adaptive bandwidth reception and data compression initialization.

In specific embodiments of concatenation formats for 802.11 transmissions, the following conditions exist:

Concatenation may be used only in conjunction with non-standard 802.11a/g rates or it may be used in a network with a mix of devices of standard 802.11a/g and devices that may process concatenated packets;

Concatenation may be used in conjunction with standard PHY rates of 802.11a/g and/or with non-standard PHY modes such as MIMO modes, or larger-channel-width modes such as 40 MHz;

Concatenation may be enabled or disabled independently for each client in a network;

Fragmentation may be disabled when concatenation is being used;

Maximum duration of a concatenated chunk may be limited to a physical time limit, such as 500 μs;

Only data frames shall be concatenated. Alternatively, any frame may be concatenated such as MAC management frames;

Piggybacking (inclusion of ACK and/or any form of Block-ACK) may or may not be used in conjunction with concatenation. A transmitter, for example, may include one block ACK request in the concatenated packet. The receiver may then include other data concatenated with the ACK response; and All the constituent packets in a chunk shall be transmitted at the same PHY rate. Alternatively, each constituent packet may be transmitted with any PHY rate.

Packet concatenation differs from other packet aggregation schemes, such as Ethernet-packet-aggregation, in that in packet concatenation, each packet may be sent to different devices with different ranges from the transmitter. Further, the MAC does not need to accumulate an entire chunk of packets before starting transmission. Packets arriving at the MAC from higher layers may be pipelined to the PHY as they arrive. In this way, the MAC does not add significant latency to the transmission of data. Furthermore, the receiver may decode the FCS field in each PSDU without waiting for additional data to arrive. In this way, the MAC of the receiver does not add latency to the reception of each constituent packet. Therefore, this packet concatenation scheme does not add significant latency to the MAC-PHY transmission and reception.

The maximum duration of a concatenated chunk may be programmable by software or a higher-level software system. This may be of value when the wireless medium exhibits heavy time-variation. As the wireless channel is modified by moving objects in the environment, concatenation should cease and a new PLCP preamble should be transmitted. Control of the maximum chunk duration is a method to adapt the transmitter hardware to changing wireless conditions.

In some embodiments, MAC protection mechanisms may be required for mixed-networks depending on the structure of the PLCP preamble and SSF. A mixed-network is defined to be a network of devices where some devices can transmit and receive concatenated packets, while other devices cannot.

Concatenated packets may be divided generally into two classes: a first class that uses a PLCP preamble that is standard-compliant to 802.11x (i.e., the PLCP preamble is reliably detectable by any standard 802.11x device); and a second class that uses a PLCP preamble that is not detectable by standard 802.11x devices. For the first class of devices, a MAC protection mechanism is not strictly needed for mixed-networks since 802.11x devices detect the PLCP preamble and the SSF correctly. With the SSF detected correctly, the length field in the SSF allows the 802.11x devices to accurately determine the time occupied by the concatenated packet. An 802.11x device will not be able to detect the exact data carried by the chunk, but the device will be able to accurately start listening to the wireless medium directly after the chunk has been transmitted. Therefore, a MAC protection mechanism is not typically required to use packet concatenation in a mixed-network.

For the second class of devices, a MAC protection mechanism is generally needed when packet concatenation is used in a mixed-network. It may be desirable to construct a PLCP preamble that will support large bandwidth signally such as 40 MHz "channel-bonding" or provide MIMO channel estimation information. In such cases, the PLCP preamble and SSF may not be detected reliably by standard 802.11x clients. Therefore, a MAC protection mechanism should be employed. This is similar to the case where an 802.11g transmission requires a MAC protection mechanism when operating in a mixed 802.11g and 802.11b network (802.11b clients cannot detect the SSF of an 802.11g client).

Typical MAC protection mechanisms include CTS-Self, RTS-CTS, CF-end in HCCA contention free period and TXOP scheduling in EDCA, all of which are known to those skilled in the art. The duration fields in the CTS frame need to account for the time of the CTS frame plus the time of transmission for the concatenated packet.

Basic 802.11 systems typically operate in "immediate ACK mode," wherein after a transmitter sends a packet to a receiver, if the receiver successfully decodes the data, the receiver immediately sends an acknowledgement (ACK) packet back to the transmitter. Packet concatenation can be used with "immediate ACK mode" when the entire chunk is destined for a single receiver. In this "immediate ACK mode," the receiver generates a single immediate ACK for the entire concatenated chunk. The ACK is generated if and only if all the constituent packets in the chunk are received correctly. If an ACK is not received for a concatenated chunk, all the constituent packets may be retransmitted.

Alternatively, the ACK may include which constituent packets are received correctly, and which were not, so that the transmitter can selectively retransmit the missing packets. In this case, a numbering scheme may be used to provide a sequence number of each packet in the chunk. This sequence number may be stored in the ESF (e.g., in the reserved bits), in the Service field, or in MAC management data.

In cases where an ACK is sent only if all packets are received correctly and AES encryption is enabled, replay check typically prevents reordering. To prevent reordering in the absence of AES, however, other mechanisms may be necessary. Consider, for example, that a chunk is transmitted containing packets with sequence numbers 1 and 2. If the receiver receives both, it updates its "last received sequence number" to 2. If the ACK for this chunk is dropped, the transmitter retransmits both sequence numbers and the receiver may again forward both to a higher-layer. An exemplary method for preventing this includes the transmitter appending a 6 byte replay counter to each packet transmitted. The replay counter is monotonically increasing. When the replay counter rolls over, there is signaling between the two ends to re-synchronize it. The receiver accepts the packet only if the received replay counter is greater than the previous replay counter. This is done only for packets received as a part of concatenated chunk. This exemplary mechanism is enabled by the assumption that if one packet is discarded in a concatenated chunk, all the packets following it in the same chunk are also discarded at the source.

Embodiments of the present invention also may be used with a no-ACK policy for all or some of the clients in the network. In such cases, the wireless medium may be sufficiently reliable that no acknowledgements are required. As is apparent to those skilled in the art, with no-ACK policies, point-to-multipoint use of concatenation is substantially simplified.

When a concatenated packet includes packets intended for multiple receivers, immediate ACK mode my not be feasible. Instead "block ACK" may be used. Block ACK is an 802.11e mechanism that allows the transmitter to individually request acknowledgements from individual receivers. An exemplary frame sequence using Block ACK includes:

Device X transmits concatenated packet to device Y and device Z.
Device X transmits an ACK-request to device Y.
Device Y transmits an ACK to device X.
Device X transmits an ACK-request to device Z.
Device Z transmits an ACK to device X.

In Block ACK mode, the sequence number check may be employed without the extra replay counter functionality.

PHY-layer statistics may still be computed for every concatenated packet. Detection statistic counters at the MAC may be quite useful in determining the maximum effective duration of a chunk. An example is a packet error rate computation for the first packet in a chunk compared to the last packet. If this error rate deviates by a significant amount, due, for example, to signal draft, synchronization, and/or other factors, the maximum duration of a concatenated packet may be shortened.

Consider the system throughput numbers shown below for a specific example. Two PHY rates are considered: 108 Mbps and 240 Mbps. 802.11e TXOP bursting is turned on and off for comparison. The system throughput without concatenation is much lower than the system throughput with concatenation. This shows the benefit of using concatenation for high PHY data rates. All the throughput numbers below are in units of Mbps. The calculations assume that the duration of a concatenated chunk is limited to 500 μs.

| PHY rate | Txop bursting | Imm ack without concatenation | Imm ack with concatenation | No ack with concatenation | Burst ack with concatenation |
| --- | --- | --- | --- | --- | --- |
| 108 | On | 59 | 84 | 92 | 90 |
| 108 | Off | 40 | 73 | 79 | 77 |
| 240 | On | 89 | 182 | 199 | 195 |
| 240 | Off | 51 | 159 | 172 | 169 |

One method for improving the effective throughput for all packet sizes is to concatenate packets into one larger packet ("chunk") and apply a single PLCP header to the chunk. Hence, even for relatively low data rates of 802.11a/g (e.g. 54 Mbps), 64 byte packets could be concatenated together to form larger chunks and thereby increase the effective throughput dramatically. The benefit of concatenation grows as the PHY data rate is increased beyond 54 Mbps.

Figure 7A:
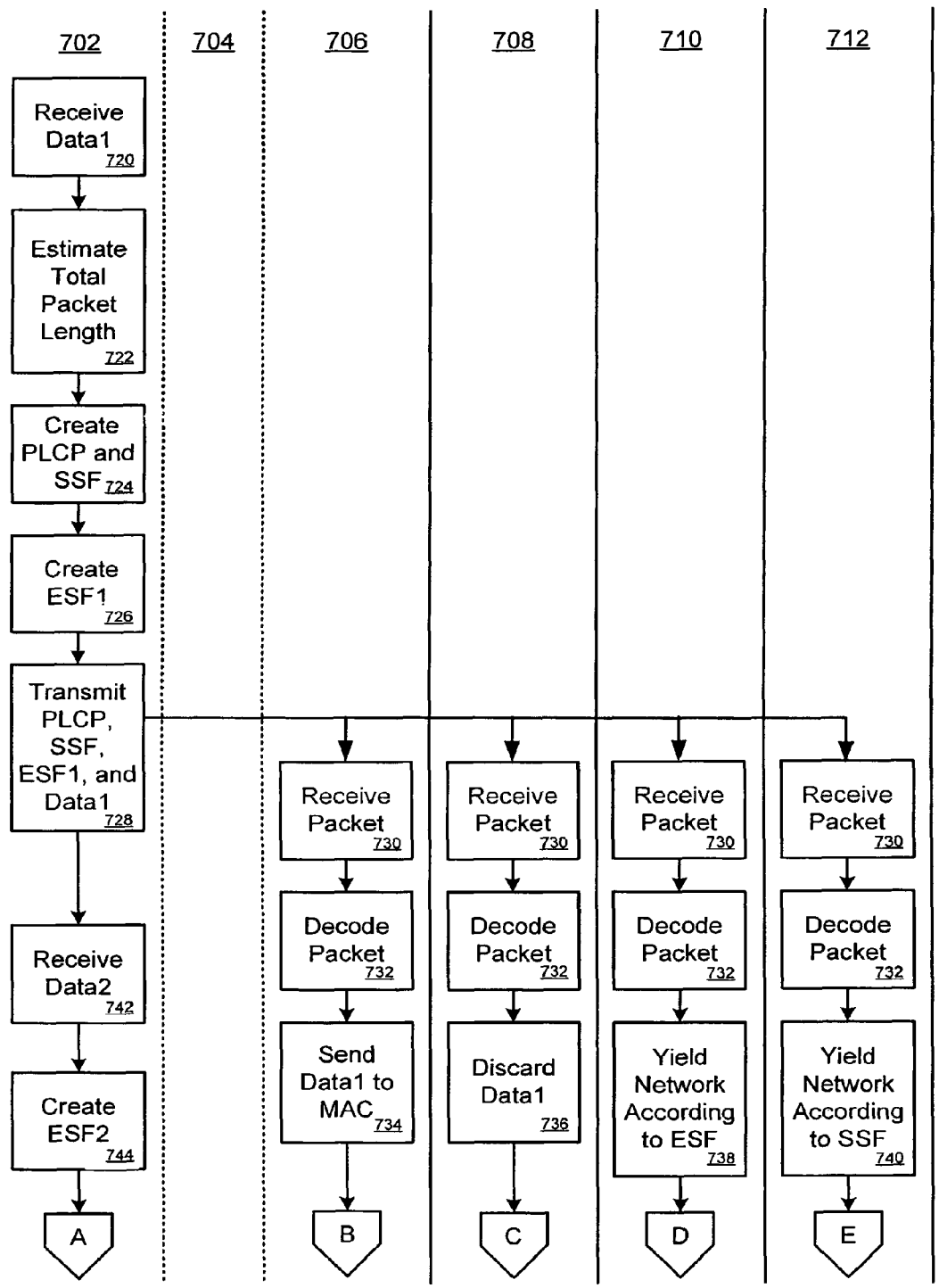
FIG. 7A-FIG. 7C illustrate a method of communicating in a wireless, packet-based network according to embodiments of the invention.
Figure 7B:
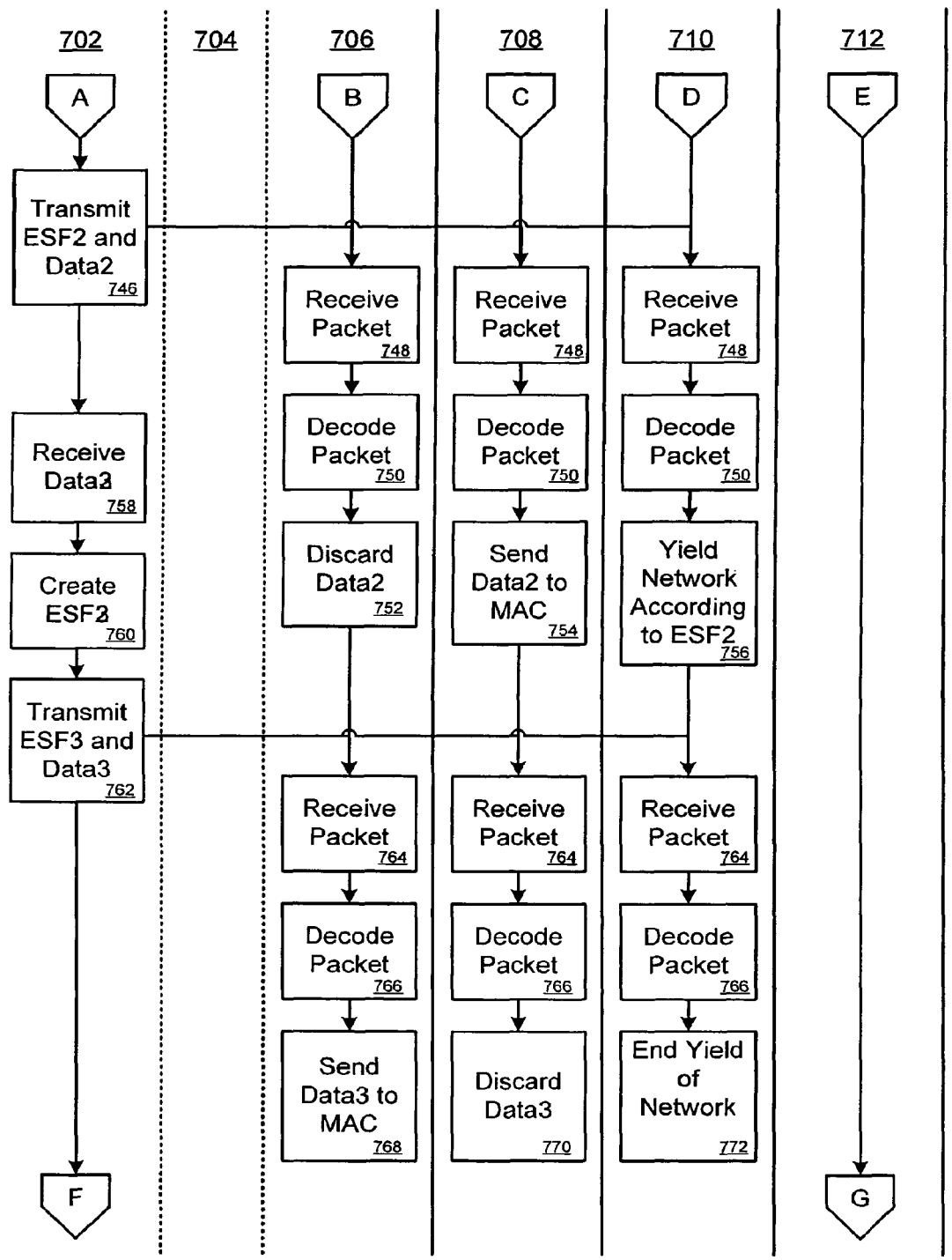
Figure 7C:
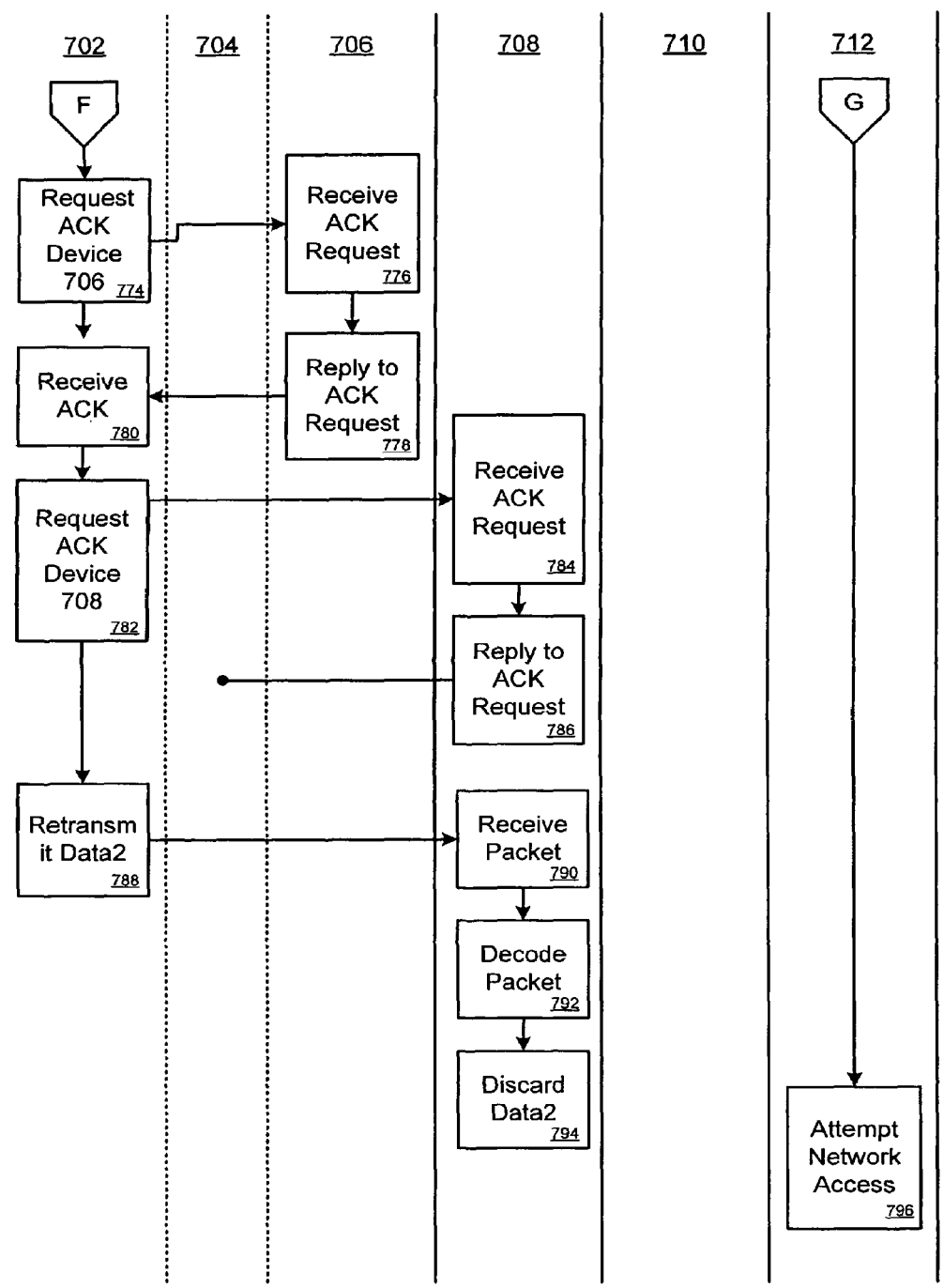

Having described several exemplary embodiments of the present invention, attention is directed to FIG. 7, which illustrates a method 700 according to embodiments of the invention. Those skilled in the art will appreciate other exemplary embodiments in light of this disclosure. Such embodiments may include more, fewer, or different steps than those illustrated and described here. Further, other embodiments may traverse steps in different orders than shown here. Thus, the ensuing description should be considered non-limiting.

Figure 5:
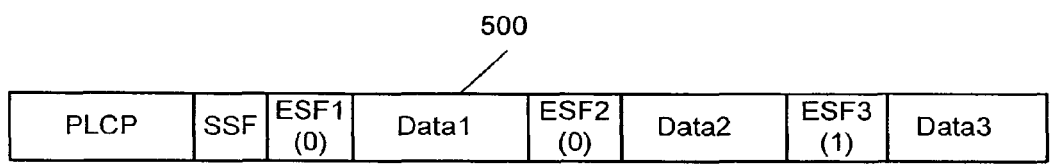
FIG. 5 illustrates a concatenated data frame having continuation bits according to embodiments of the invention.
Figure 8:
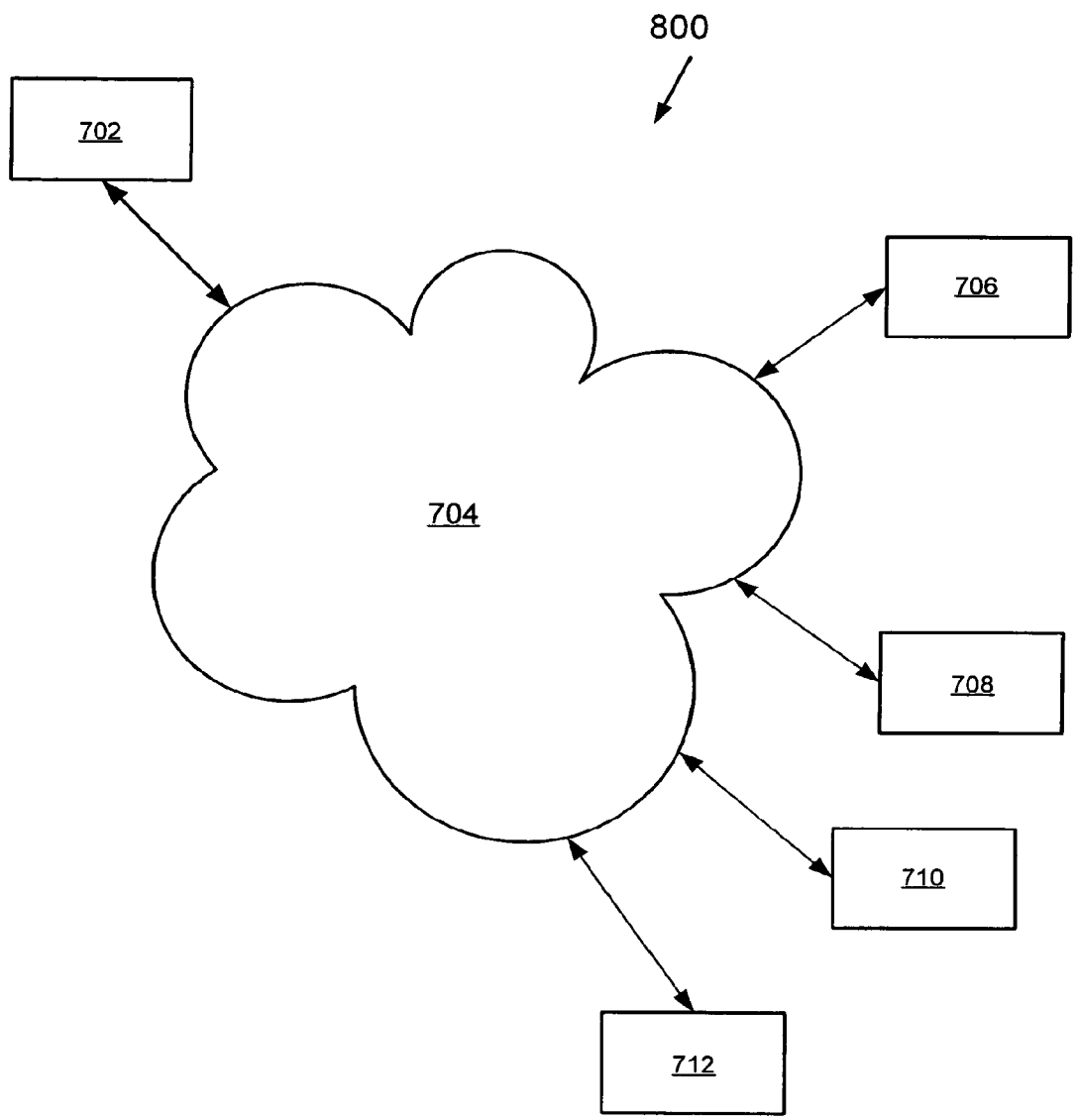
FIG. 8 illustrates an exemplary wireless network in which the method of FIG. 7 might be implemented according to embodiments of the invention.

The method 700 illustrates interaction among several environments: a transmitter 702, a wireless medium 704, a first concatenation-enabled receiver 706, a second concatenation-enabled receiver 708, a concatenation-enabled device 710 (i.e., a concatenation-enabled device to which a transmission is not directed), and a legacy device 712 (i.e., a non-concatenation-enabled device). One possible arrangement of the environments in a network is illustrated in FIG. 8. In the ensuing description, a concatenated packet is prepared by the transmitter 702 and transmitted to both receivers 706, 708. The concatenated packet has the form of the 802.11 packet 500 illustrated in FIG. 5, although this is not required. The transmission may be based on any of a variety of other formats and may include different numbers of concatenated data packets. In this example, the transmission includes "last packet" signaling as illustrated in the packet of FIG. 5. Embedded packets Data1 and Data3 are directed to the first receiver 706; embedded packet Data2 is directed to the second receiver 708. Both the device 710 and the legacy device 712 are within listening distance of the transmitter 702.

The method begins at block 720 at which point the physical layer processing of the transmitter 702 receives a first data packet, Data1, along with the data rate at which the packet should be transmitted. The packet may be, for example, a PSDU as described previously. At block 722, the duration of the concatenated packet is estimated. This is done by calculating the time it takes to transmit the packet size at the data rate specified. In some embodiments, the PHY may be a dumb-processor, and does not know how to compute the duration, nor what data rate to choose for each packet (and hence the time it takes to transmit each packet). This is typically computed by the MAC which has knowledge of its packet buffer or how many packets are waiting to be transmitted and at what data rate (which is based on the data rate reception capabilities of each receiver), and traffic history and trends. The estimate may be based on recent transmission history, network traffic, or more directly based on the number of packets waiting to be transmitted in packet memory, the number of packets that are queued in the upper-layers of the protocol, and the like. The PHY processing then uses the chunk-length estimate and other information to create a PLCP preamble and SSF at block 724. The PHY processing also creates an ESF, ESF1, according to embodiments of the invention, at block 726. The PHY processing then begins transmitting the concatenated packet by transmitting the PLCP preamble, SSF, and ESF1, and Data1 at block 728. Note that while other bits of the concatenated packet may be created and incorporated at this or other points in the method 700, such may be standard to the particular transmission protocol and have been omitted from this discussion so as not to unnecessarily obscure important aspects of the present invention. As mentioned previously, this description is merely exemplary of a variety of possible embodiments according to the invention. Examples of other functions specific to 802.11 protocols includes adding tail bits, adding pad bits, accomplishing OFDM (e.g., FFT, guard-interval insertion, etc.), and/or the like.

At blocks 730, each device within listening range of the transmitter 702 begins receiving the packet. Each device begins to decode the packet at block 732 which includes synchronizing to the transmitter (time and frequency), synchronizing to the wireless channel behavior (channel estimation), and detecting data.

The device 706, the intended recipient of Data1, sends the packet to its MAC layer for further processing at block 734. The device 708, also sends the packet to its MAC layer where the MAC recognizes that the Data1 packet is addressed to a different device and discards the Data1 at block 736. The devices 706, 708, 710, and 712 use the information from the SSF of the received packet to estimate for how long to yield the network. This determination is made using the rate and length fields of the SSF as described previously. Being a concatenation-enabled device according to embodiments of the invention, the devices 706, 708, and 710 may use the ESF to update the estimate and may continue to monitor the ensuing ESFs to determine when the network is again available. However, the length of the chuck as determined by the SSF typically is the primary source of deferral until the final ESF (for example, the ESF with Last Bit set) is correctly decoded and remaining chuck duration time is accurately known. Hence, the device 710 begins yielding the network at block 738 for a time defined by the SSF. Device 710 also decodes Data1 and sends the packet to its MAC, which determines that Data1 was not intended for it and discards it (not shown). The device 712 performs a similar determination, based solely on the SSF, at block 740. The device 712 also attempts to decode the data for the entirety of the chunk, but the MAC deems the data to be a lost packet. It should be appreciated that other devices within listing range of the transmitter 702 perform similar operations.

At block 742, the PHY processing of the transmitter 702 receives another data packet, Data2, from the MAC layer, along with the data rate at which Data2 should be transmitted. The data packet Data2 and data rate may be received and processed while previous portions of the concatenated packet (PLCP Preamble, SSF, ESF1, Data1) are being transmitted. The transmitter 702 creates ESF2 at block 744 and begins transmitting ESF2 and Data2 at block 746. The devices 706, 708, and 710 receive the transmission at blocks 748 and decode it at blocks 750. Note that, for purposes of this description, it will be assumed that the device 712 does not correctly receive the transmission of ESF2 and Data2.

The device 706 provides Data2 to its MAC, which discards Data2 at block 752, since Data2 is intended for the device 708. The device 708, at block 754, sends Data2 to its MAC layer for further processing. The device 710 provides Data2 to its MAC, which also discards Data2, since Data2 is intended for the device 708. The devices 706, 708, and 710, recognizing, based on ESF2, that Data2 is not the last data packet, continue to yield the network, based on the chunk length calculated from the SSF. This is shown as block 756 for the device 710 only.

At block 758, the PHY processing for the transmitter 702 receives Data3 and the data rate for transmission, and, at block 760, creates ESF3. Data3 being the final data packet to concatenate into the present transmission, the transmitter 702 sets the "Last bit" appropriately (see FIG. 5). The transmitter 702 begins transmitting ESF3 and Data3 at block 762.

The devices 706, 708, 710 receive ESF3 and Data3 at blocks 764 and each decodes the transmission at blocks 766. The device 706, at block 768, sends Data3 to its MAC layer for further processing. The devices 708 and 710 also send Data3 to their respective MACs, and the data is discarded. This is shown for the device 708 only as block 770. Recognizing, based on ESF3, that Data3 is the last data packet of the transmission, at block 772, the device 710 ceases to yield the network at the end of the chunk transmission. The devices 706 and 708 may perform a similar function.

At block 774, the transmitter prepares and transmits an acknowledge request. The request is directed to the device 706. Having successfully received the two packets Data1 and Data3, the device 706 receives the ACK request at block 776 and responds by sending an ACK at block 778, indicating that it received both Data1 and Data3. At block 780, the transmitter 702 receives the ACK reply. At block 782, the transmitter 702 directs an ACK request to the device 708. The device 708 receives the request at block 784 and transmits a reply at block 786. The transmitter 702, however, does not receive the reply due, for example, to some random noise event in the wireless medium. Hence, the transmitter 702 may re-send the ACK request, in which case the device 708 will re-send the ACK. If the transmitter 702 correctly receives this ACK, then the sequence is complete. Alternatively, at block 788, the transmitter 702 re-transmits Data2, the only data it sent to the device 708. Upon receiving the retransmission at block 790, the device 708 decodes the transmission at block 792 and discards it at block 794, since the retransmission was not necessary. The transmitter then may re-send an ACK request to device 708.

Having waited the appropriate amount of time based on the SSF information, the device 712 attempts to acquire the network for a transmission at block 796. Although intervening transmissions may have extended the time for the network to be yielded, we have assumed that the device 712 did not receive those intervening transmissions.

Having described several embodiments, it will be recognized by those of skill in the art that various modifications, alternative constructions, and equivalents may be used without departing from the spirit of the invention. Additionally, a number of well known processes and elements have not been described in order to avoid unnecessarily obscuring the present invention. Accordingly, the above description should not be taken as limiting the scope of the invention, which is defined in the following claims.

What is claimed is:

1. A transmitting device in a wireless network, wherein the transmitting device is configured to:
   receive at least a first data packet and a second data packet;
   prepare a preamble;
   prepare at least a first signal field for the first data packet and a second signal field for the second data packet; and
   transmit at least the preamble, the first signal field, the first data packet, the second signal field, and the second data packet as a concatenated packet to a receiving device;
   wherein the first signal field comprises a first continuation field and the second signal field comprises a second continuation field.

2. The transmitting device of claim 1, further configured to transmit the concatenated packet to the receiving device across an 802.11-based network.

3. The transmitting device of claim 1, wherein the first data packet is immediately preceded in time by the first signal field and the second data packet is immediately preceded in time by the second signal field.

4. The transmitting device of claim 1, wherein the first continuation field has a first state or a second state and the second continuation field has the first state or the second state.

5. The transmitting device of claim 4, wherein the first state indicates a subsequent packet in the concatenated packet and the second state indicates no subsequent packet in the concatenated packet.

6. The transmitting device of claim 1, further configured to receive at least three packets and transmit at least the preamble and the at least three packets as the concatenated packet to the receiving device.

7. The transmitting device of claim 6, further configured to prepare at least three signal fields corresponding to the at least three data packets, wherein each of the at least three signal fields immediately precedes a corresponding data packet of the at least three data packets in time in the concatenated packet.

8. The transmitting device of claim 7, wherein the last signal field of the at least three signal fields comprises an indication that no further data packets follow the corresponding last data packet in the concatenated packet.

9. A wireless communication system, comprising:
   means for transmitting a concatenated packet across a network, the concatenated packet comprising a preamble, a plurality of data packets and a plurality of signal fields corresponding to the plurality of data packets; and
   means for receiving the concatenated packet;
   wherein the plurality of signal fields comprises a plurality of continuation fields.

10. The wireless communication system of claim 9, wherein the network is an 802.11-based network.

11. The wireless communication system of claim 9, wherein each signal field of the plurality of signal fields immediately precedes each corresponding data packet of the plurality of data packets in time.

12. The wireless communication system of claim 9, wherein the plurality of continuation fields each comprises a first state or a second state.

13. The wireless communication system of claim 12, wherein the first state indicates further packets in the concatenated packet.

14. The wireless communication system of claim 12, wherein the second state indicates no further packets in the concatenated packet.

15. The wireless communication system of claim 9, wherein the concatenated packet comprises the preamble, a first signal field, a first data packet, a second signal field, a second data packet, a third signal field signaling the end of the concatenated packet and a third data packet.

16. A method, comprising:
   receiving, at a transmitting device, at least a first data packet and a second data packet;
   concatenating the first data packet, a first signal field, a second signal field and the second data packet to a concatenated packet;
   appending a preamble to the concatenated packet; and
   transmitting the concatenated packet across a wireless network to a receiving device;
   wherein the first signal field comprises a first continuation field and the second signal field comprises a second continuation field.

17. The method of claim 16, wherein the wireless network is an 802.11-based network.

18. The method of claim 16, wherein the first signal field immediately precedes the first data packet in time and the second signal field immediately precedes the second data packet in time.

19. The method of claim 16, wherein first continuation field comprises a first state or a second state and the second continuation field comprises a first state or a second state.

20. The method of claim 16, wherein the receiving further comprises receiving at least a third packet and the concatenating further comprises concatenating the first data packet, the second data packet and the third data packet to the concatenated packet.

21. The method of claim 20, wherein the concatenating further comprises concatenating the first signal field, the first data packet, the second signal field, the second data packet, a third signal field and the third data packet.

22. The method of claim 16, wherein the receiving further comprises receiving, at the transmitting device, a plurality of data packets, the concatenating further comprises concatenating a plurality of signal fields corresponding to the plurality of data packets and the plurality of data packets into a concatenated packet, wherein the last of the plurality of signal fields comprises an indication that no further data packets follow the corresponding last data packet of the plurality of data packets.

23. A computer readable medium having stored there on processor executable instructions that cause a computer to perform a process, the process comprising:
receiving at least a first data packet and a second data packet at a transmitting device;
preparing a preamble and at least a first signal field for the first data packet and a second signal field for the second data packet; and
transmitting at least the preamble, the first data packet, the first signal field, the second signal field, and the second data packet as a concatenated packet across a wireless network to a receiving device;
wherein the first signal field comprises a first continuation field.

24. The computer readable medium of claim 23, wherein the transmitting further comprises transmitting the concatenated packet to the receiving device across an 802.11-based network.

25. The computer readable medium of claim 23, wherein the transmitting further comprises transmitting at least the preamble, the first signal field, the first data packet, the second signal field, and the second data packet as the concatenated packet to the receiving device.

26. The computer readable medium of claim 25, wherein the first data packet is immediately preceded in time by the first signal field.

27. The computer readable medium of claim 26, wherein the second data packet is immediately preceded in time by the second signal field.

28. The transmitting device of claim 23, wherein the first continuation field has a first state or a second state.

29. The computer readable medium of claim 28, wherein the second signal field comprises a second continuation field.

30. The computer readable medium of claim 29, wherein the second continuation field has the first state or the second state.

31. The computer readable medium of claim 28, wherein the first state indicates a subsequent packet in the concatenated packet.

32. The computer readable medium of claim 28, wherein the second state indicates no subsequent packet in the concatenated packet.

33. The computer readable medium of claim 23, wherein the receiving further comprises receiving at least three data packets.

34. The computer readable medium of claim 33, wherein the process further comprises preparing at least three signal fields corresponding to the at least three data packets.

35. The computer readable medium of claim 34, wherein the transmitting further comprises transmitting at least the preamble, the at least three signal fields and the at least three data packets as the concatenated packet to the receiving device.

36. The computer readable medium of claim 35, wherein each of the at least three signal fields immediately precedes each of the at least three data packets.

37. The computer readable medium of claim 36, wherein the last of the at least three signal fields comprises an indication that no further data packets follow the last of the at least three data packets.

* * * * *